United States Patent [19]
Lyon

[11] Patent Number: 5,265,648
[45] Date of Patent: Nov. 30, 1993

[54] PIPE LINER AND METHOD OF INSTALLATION THEREOF

[75] Inventor: Lyman R. Lyon, Bloomfield Hills, Mich.

[73] Assignee: Great Lakes and Southern Research Limited Prtnshp., Atlantic Beach, Fla.

[21] Appl. No.: 777,017

[22] Filed: Oct. 16, 1991

Related U.S. Application Data

[63] Continuation-in-part of Ser. No. 389,952, Aug. 7, 1989, abandoned.

[51] Int. Cl.$^5$ .................................... F16L 55/18
[52] U.S. Cl. ........................... 138/98; 138/97; 264/269; 405/150.1
[58] Field of Search ............... 138/98, 97, DIG. 1, 138/149; 264/267; 405/150.1, 154; 156/287

[56] References Cited

U.S. PATENT DOCUMENTS

| | | | |
|---|---|---|---|
| 2,312,993 | 3/1943 | Stephens | 138/98 X |
| 4,714,095 | 12/1987 | Muller et al. | 138/98 |
| 4,972,880 | 11/1990 | Stranis | 138/98 |
| 5,101,863 | 4/1992 | Fujii et al. | 138/98 |

Primary Examiner—Frankie L. Stinson
Attorney, Agent, or Firm—Lyman R. Lyon

[57] ABSTRACT

A liner for a pipe comprises a pair of imperforate sleeves telescoped within one another and having a resin absorbant fiber mat and resin supply tube disposed therebetween. A polymerizable resin is injected between the sleeves through the resin supply tube. The resin tube may be withdrawn from the pipe. The liner is folded to a U-shaped cross section to facilitate insertion into the pipe.

4 Claims, 3 Drawing Sheets

PIPE LINER AND METHOD OF INSTALLATION THEREOF

CROSS-REFERENCE TO RELATED APPLICATION

This application is a continuation-in-part of my copending application, Ser. No. 389,952, filed Aug. 7, 1989, for "Pipe Liner and Method of Installation Thereof" now abandoned.

BACKGROUND OF THE INVENTION

The invention relates generally to the rehabilitation of deteriorated water or sewer pipe. A specific problem solved by the present invention is the problem of forming a new pipe in a totally disintegrated pipe.

SUMMARY OF THE INVENTION

The pipe lining system of the instant invention, comprises a pair of flexible imperforate elastomeric sleeves telescoped within one another and having a resin absorbent mat therebetween. The radially outer sleeve has an outside diameter substantially equal to the inside diameter of the deteriorated pipe. A resin supply tube is also disposed between sleeves upon assembly of the lining system. After the sleeve assembly is drawn into the sewer pipe, resin is pumped through the resin supply tube and applied to the mat.

DETAILED DESCRIPTION OF THE PREFERRED EMBODIMENT OF THE INVENTION

Figure 1:
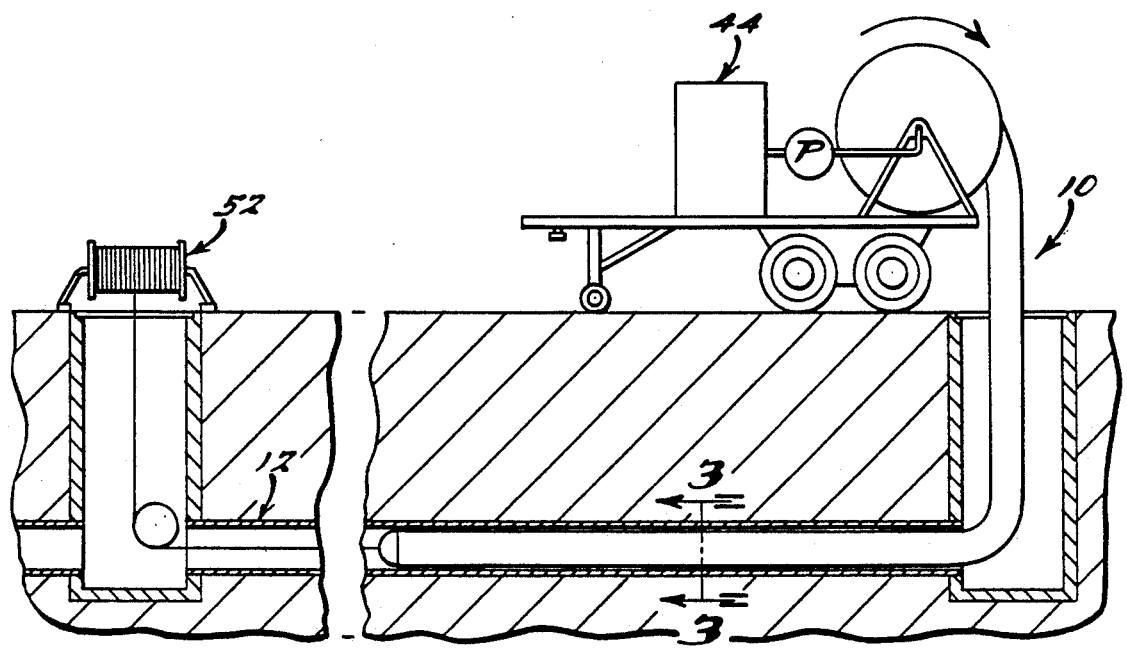
FIG. 1 is a diagrammatic view of the first stage of liner installation.
Figure 2:
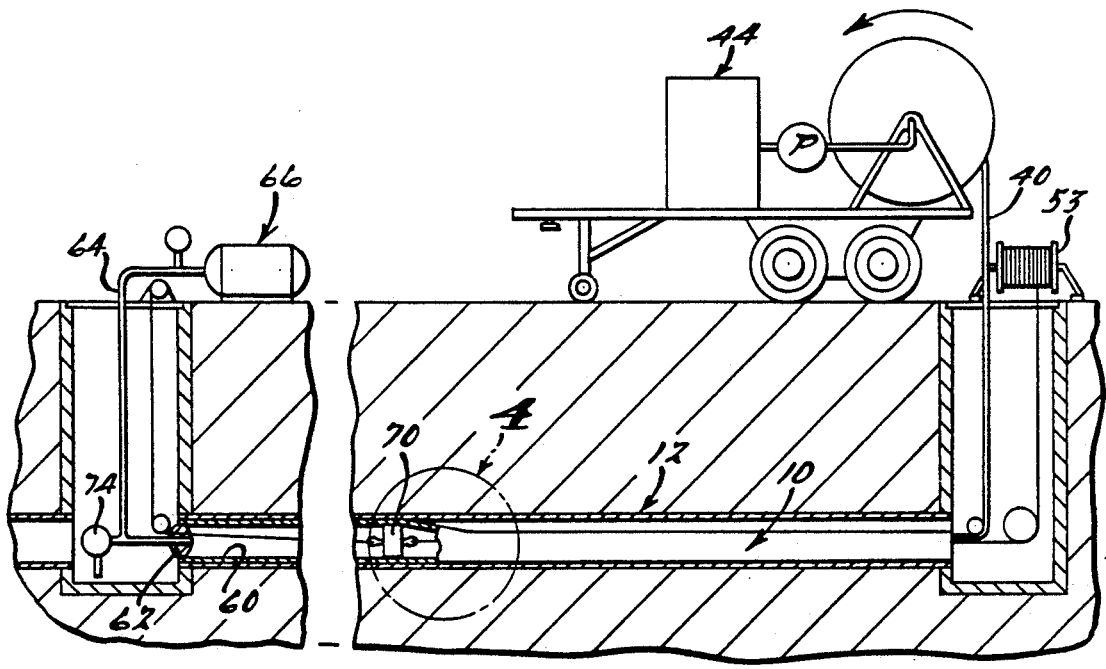
FIG. 2 is a diagrammatic view of the final stage of installation.
Figure 3:
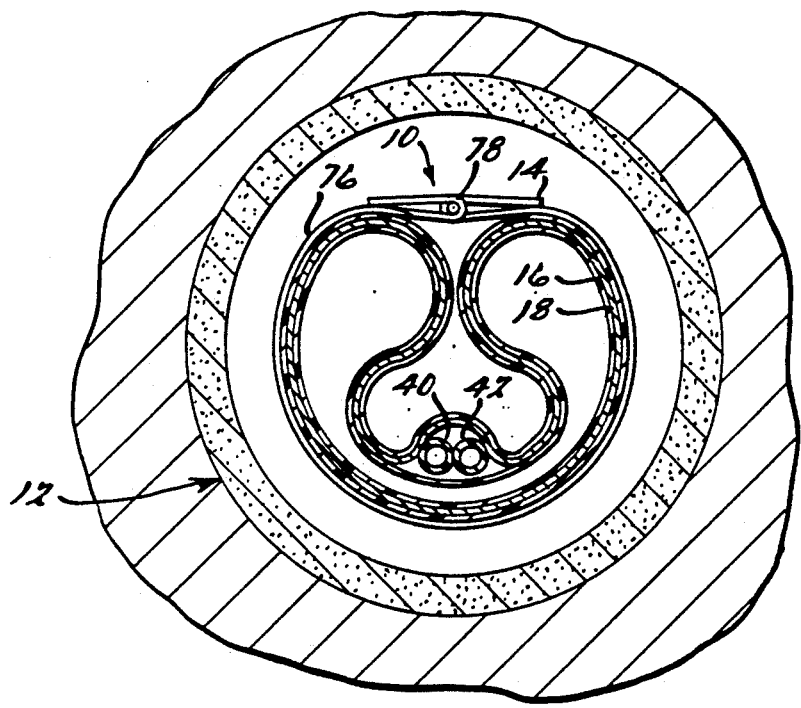
FIG. 3 is a cross-sectional view taken along the line 3—3 of FIG. 1.
Figure 4:
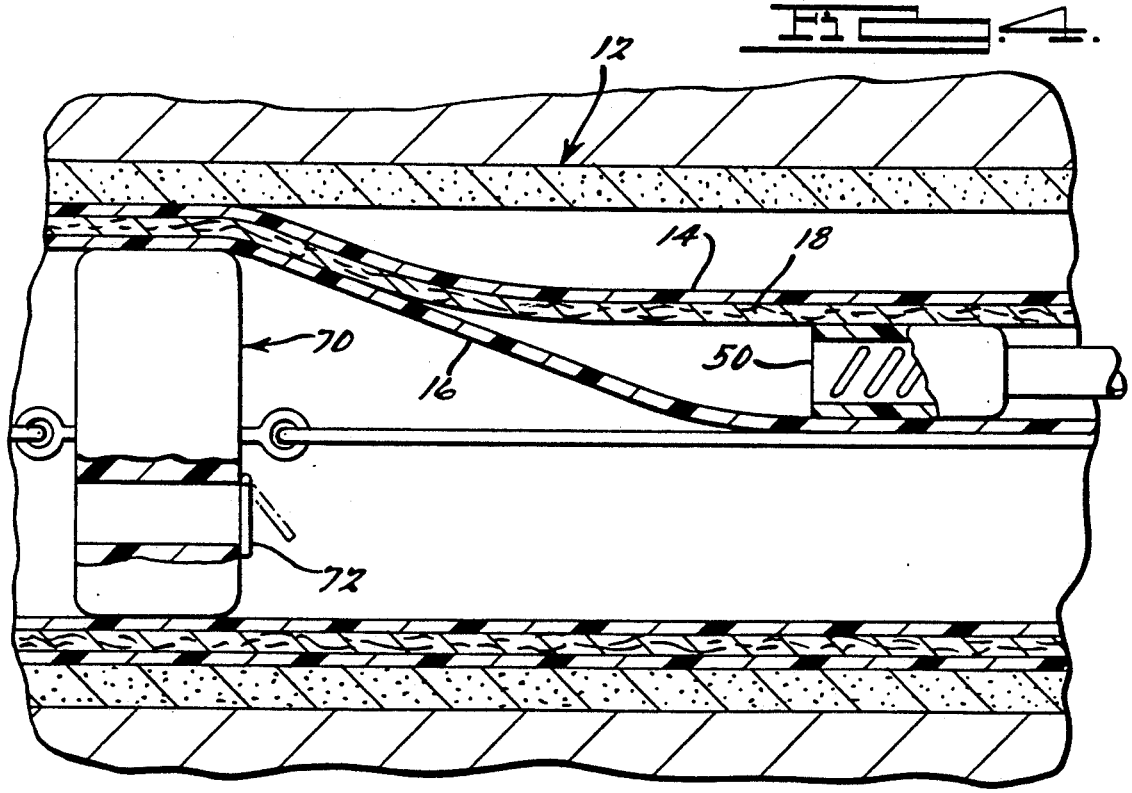
FIG. 4 is a view taken within the circle 4 of FIG. 2.
Figure 5:
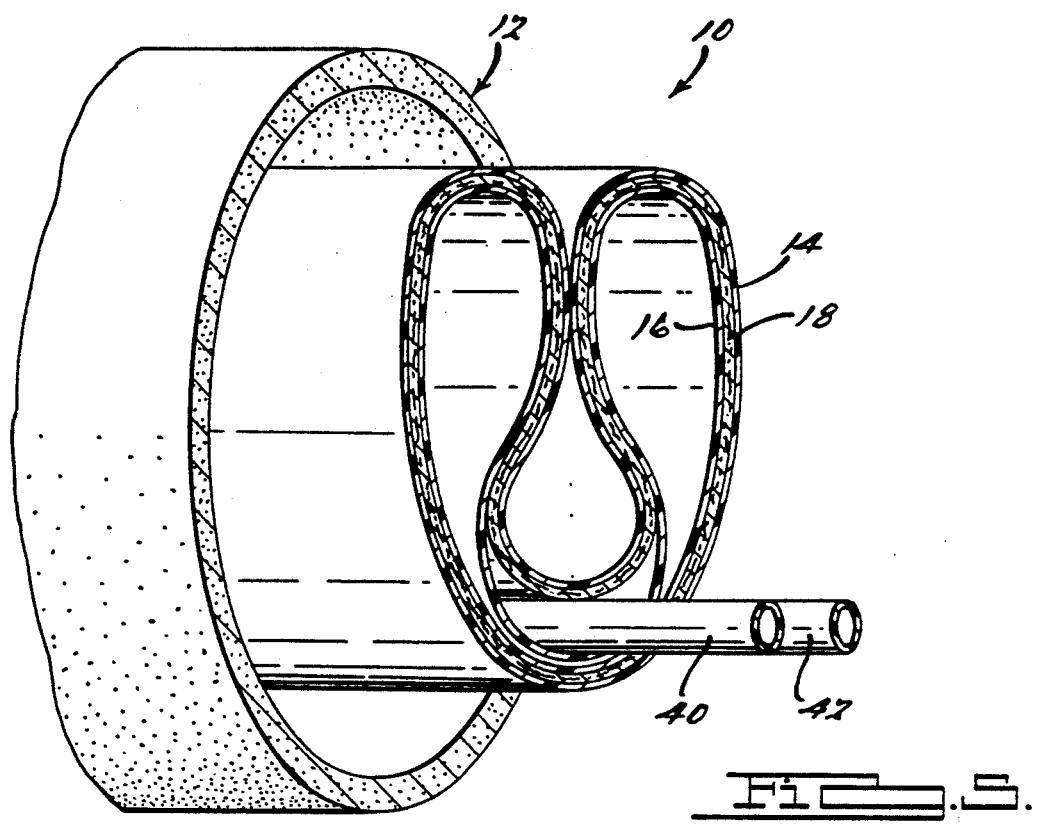
FIG. 5 is a perspective view of the liner after the first phase of installation.

Referring to FIG. 1 of the drawings, a pipe lining system 10 constructed in accordance with the instant invention is shown in association with a sewer pipe 12 that is to be rehabilitated. As best seen in FIG. 4, the pipe lining system 10 comprises a relatively thin flexible, imperforate outer elastomeric sleeve 14 and a relatively heavier, imperforate elastomeric inner sleeve 16, both of which are made from, for example, polyurethane. An intermediate sheath 18 of, for example, resin absorbent polypropelene mat is disposed between the sleeves 14 and 16 and bonded thereto by a conventional polyurethane resin system obtainable from the BASF Chemical Corporation. The outside diameter of the outer sleeve 14 is substantially equal to the inside diameter of the pipe 12.

In accordance with one feature of the instant invention, a pair of resin supply tubes 40 and 42 are disposed between the inner sleeve 16 and mat 18 upon assembly thereof for the separate transport of the components of a polymerizable polyurethane resin system. The liquid resin system components are pumped through the tubes 40 and 42 from conventional resin supply drums, one of which is shown and designated by the numeral 44. The ends of the tubes 40 and 42 are joined to a conventional static mixer 50 which is also disposed between the mat 18 and inner sleeve 16.

To initiate installation, the sleeves 14 and 16, mat 18, resin tubes 40 and 42, and static mixer 50 are drawn into the pipe 12 by a winch 52. Thereafter, the resin tubes 40 and 42 and static mixer 50 are retracted from the sewer pipe by a winch 53 while resin is concomitantly pumped through the tubes 40 and 42, mixed in the mixer 50, and discharged therefrom onto the mat 18. The resin thereafter wicks around the mat 18 between the sleeves 14 and 16 and polymerizes in approximately 100 to 500 seconds.

The amount of resin used is based on the application and thickness of liner desired. A conventional commercially available two part polyurethane resin system may be used, for example, a system available from BASF Chemical Corporation.

After introduction of the lining system 10 into the pipe 12, one end 60 of the sleeves 14 and 16 is closed by a plug 62, having an air line 64 connected thereto and to an air compressor 66 for the admittance of pressurized air. Radial expansion of the sleeves 14 and 16 is achieved by air pressure which maintains the sleeves 14 and 16 in the radially expanded condition until polymerization of the resin injected therebetween.

A pig 70 is employed to maintain a pressure differential between ambient pressure and pressure in the space between the plug 62 and pig 70 to facilitate expansion of the sleeves 14 and 16 until polymerization of the resin system. The pig 70 has a pressure controlled valve 72 therein that opens to permit passage of water from an adjacent sewer line that is pumped into the liner 10 behind the pig 70 by a transfer pump 74 along with air from the line 64. Thus, bypassing of the sewer 12 while the liner 10 is being installed is eliminated. It is to be noted that no air or water is admitted between the sleeves 14 and 16 ensuring that the resin absorbent mat 18 is clean, dry, and devoid of admixed water and air so as to readily absorb the resin from the mixer 50 resulting in a liner free of voids upon polymerization of the resin.

As seen in FIG. 4, the lining system 10 is folded to a generally U-shaped cross section to facilitate induction into the sewer pipe 12. The U-shaped cross section is maintained by a strap 76, the ends of which are tethered by a retractable cable 78. The cable 78 is retracted after the liner 10 is drawn into the sewer but prior to injection of resin thereinto.

Figure 6:
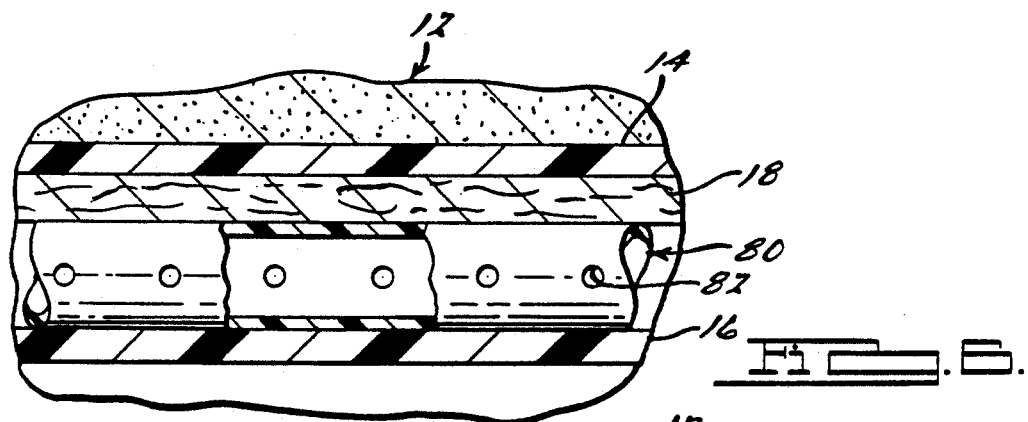
FIG. 6 is a cross-sectional view of a modified resin application system.

As seen in FIG. 6, a second embodiment of the invention comprises a non-retractable resin tube 80 having a plurality of holes 82 therein for the discharge of resin onto the fiber mat 18. The resin is mixed exteriorly of the sewer pipe 12. The resin tube 80 is permanently encapsulated between the sleeves 14 and 16 upon polymerization of the resin system.

Figure 7:
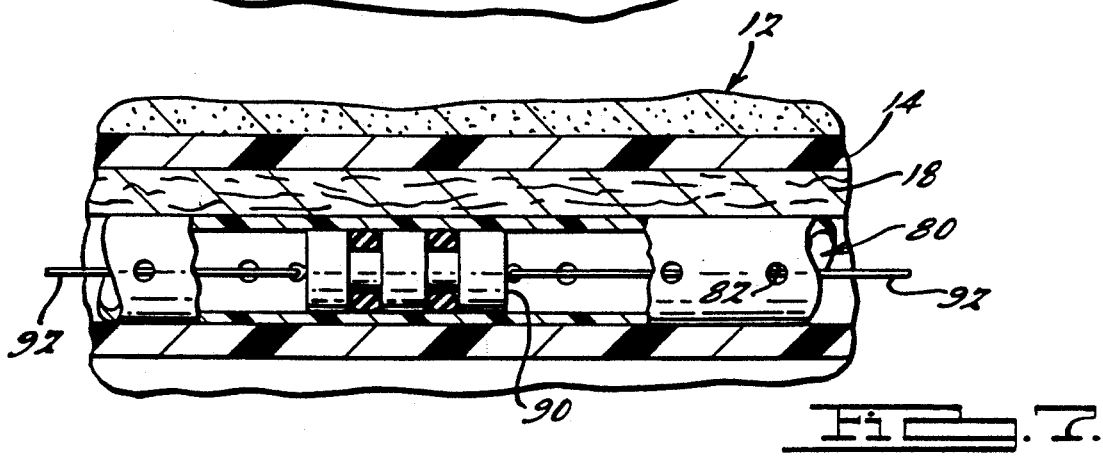
FIG. 7 is a cross-sectional view of yet another resin application system.

As seen in FIG. 7, the resin tube 80 of FIG. 6 is provided with a resin flow control piston 90 that is drawn through the tube 80 by a line 92. Resin is forced to flow outwardly of the holes 82 behind the piston as opposed to initially flowing longitudinally of the tube 80.

While the preferred embodiments of the invention have been disclosed, it should be appreciated that the invention is susceptible of modification without departing from the scope of the following claims.

I claim:

1. A system for lining a pipe comprising
a pair of imperforate sleeves telescoped within one another,
a resin absorbent fiber mat disposed between said sleeves, and
a resin supply tube disposed between said sleeves and having a plurality of discharge apertures spaced longitudinally thereof for the discharge of resin and communicating with the resin absorbent fiber mat on said sleeves for the dispersal of resin thereon, said tube being permanently encapsulated in said liner upon polymerization of the resin system.

2. A liner system for a sewer pipe comprising
a fluid impervious sleeve of elastomeric material,
a resin absorbent fiber matrix disposed about said sleeve,
a resin transport tube disposed exteriorly of said sleeve having a plurality of apertures spaced longitudinally thereof in fluid communication with said fiber matrix, said tube being permanently encapsulated in said liner upon polymerization of the resin system, and
means for pumping resin through said tube.

3. A liner in accordance with claim 2 including a piston movable longitudinally of said resin tube to control the discharge of resin through the apertures therein.

4. A liner in accordance with claim 2 including a second fluid impervious sleeve disposed radially outwardly of said resin absorbent fiber matrix.

* * * * *